United States Patent
Gutekunst

(10) Patent No.: US 7,966,653 B2
(45) Date of Patent: Jun. 21, 2011

(54) METHOD AND DATA PROCESSING SYSTEM FOR DETERMINING USER SPECIFIC USAGE OF A NETWORK

(75) Inventor: Stefan Gutekunst, Bruehl (DE)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 11/673,637

(22) Filed: Feb. 12, 2007

(65) Prior Publication Data

US 2007/0136575 A1    Jun. 14, 2007

(30) Foreign Application Priority Data

Feb. 21, 2006   (EP) ..................................... 06110217

(51) Int. Cl.
*G06F 7/04* (2006.01)
*H04L 9/00* (2006.01)
*H04L 9/32* (2006.01)

(52) U.S. Cl. ............ 726/7; 713/153; 713/154; 713/155; 713/156; 713/157; 726/4; 726/5; 726/6

(58) Field of Classification Search ........................ 726/7
See application file for complete search history.

(56) References Cited

U.S. PATENT DOCUMENTS

| | | | |
|---|---|---|---|
| 6,499,115 B1 | 12/2002 | Wiedeman et al. | |
| 6,651,093 B1 | 11/2003 | Wiedeman et al. | |
| 6,654,347 B1 | 11/2003 | Wiedeman et al. | |
| 7,606,877 B2 * | 10/2009 | Lee et al. | 709/219 |
| 2003/0232615 A1 * | 12/2003 | Kim et al. | 455/405 |
| 2004/0047352 A1 | 3/2004 | Wiedeman et al. | |
| 2004/0218538 A1 | 11/2004 | Wiedeman et al. | |
| 2007/0111798 A1 * | 5/2007 | Robb et al. | 463/42 |

OTHER PUBLICATIONS http://www.ietf.org/rfc/rfc2866.txt, Network Working Group, Request for Comments: 2866, C. Rigney et al., Jun. 2000, "RADIUS Accounting".
http://www.ietf.org/rfc/rfc2865.txt, Network Working Group, Request for Comments: 2865, C. Rigney et al., Jun. 2000, Remote Authentication Dial in User Service (RADIUS).

* cited by examiner

*Primary Examiner* — Longbit Chai
(74) *Attorney, Agent, or Firm* — Scully, Scott, Murphy & Presser, P.C.; John Pivnichny

(57) ABSTRACT

There is provided a method of determining user specific usage of a network, wherein a user is accessing the network for a session from a client system via a layer two access port of a switch, wherein the layer two access port of the switch is assigned to the user of the client system for that session, wherein a first value, which is indicative of the magnitude of a packet counter of the layer two access port, is determined when the layer two access port becomes active, wherein a second value, which is indicative of the magnitude of the packet counter, is determined when the layer two access port becomes inactive, and wherein the first value and the second value are stored.

20 Claims, 5 Drawing Sheets

METHOD AND DATA PROCESSING SYSTEM FOR DETERMINING USER SPECIFIC USAGE OF A NETWORK

FIELD OF THE INVENTION

The invention relates to a method and data processing system for determining user specific usage of a network in general and to a method and data processing system for determining user specific network usage for accounting in particular.

BACKGROUND OF THE INVENTION

The network of an enterprise or organization is typically organized in a centralized way, which means that one unit is responsible for the maintenance and administration of the enterprise's or organization's network while all other units or departments are able to use the network resources. Information technology has become more and more important as a way of doing business while the complexity of network environments has increased. Due to the increase in complexity, the costs of maintaining, upgrading, and administrating network environments has also increased.

The costs of the administration and maintenance of the network are typically shared between all units or all divisions of an enterprise or an organization. Today, there is however no commercial product available which can be employed to gather the network usage of all users of a network so that the corresponding departments or units of the users can be billed in accordance with the network usage of their users.

It is desirable to be able to do accounting so that the unit that maintains and administrates the network can act as a company's or organization's internal service provider. If it could be possible to determine the network usage of a department within a given period of time, for example each month, the costs could be allocated exactly to the corresponding cost centers.

There is therefore a need for an improved method and an improved data processing system for determining user specific network usage of a network according to which users or departments could be charged.

SUMMARY OF THE INVENTION

In accordance with an embodiment of the invention, there is provided a method of determining user specific network usage of a network, when a user accesses the network from a client system the method comprising the steps of, assigning a layer two access port of a switch to the user of the client system for a session, determining a first value being indicative of the magnitude of a packet counter of the layer two access port when the layer two access port becomes active, determining a second value being indicative of the magnitude of another packet counter is determined when the layer two access port becomes inactive, and storing the first value and the second value.

The magnitude of the packet counter is read when the layer two access port becomes active which refers to the point in time when the layer two access port is assigned to the user of the client system and another packet counter is read again when the two layer access port becomes inactive which refers to the point in time when the user ends his session.

In accordance with an embodiment of the invention, a user specific network usage of the session is determined by taking the difference between the second value and the first value. The user specific network usage of the session can then be stored for example on a centralized database. The method in accordance with the invention is particularly advantageous as it allows determination of the network usage of a user during a session. The network usages that are determined are added by session. The user can then be charged periodically, for example each month, in compliance with the network usage. The method in accordance with the invention is furthermore advantageous as by adding the network usages of all users, the network department obtains information about the total usage of the network so that it is able to make more precise forecasts of the required network resources in the future.

In accordance with an embodiment of the invention, a user specific certificate is assigned to the user, wherein the method further comprises the step of receiving the user specific certificate at the switch, and wherein the layer two access port of the switch is assigned to the user for the session after validation of the certification. In order to identify the user at the layer two access port, a user specific certification by which the user is uniquely identifiable is assigned to the user. The validity of the certificate is checked before the layer two access port is assigned to the user. The advantage is that the user can be logged onto the network from any client computer of the network since the user is uniquely identifiable via the certificate.

In accordance with an embodiment of the invention, the certificate is assigned to an account of the user at a domain server, and the certificate is then sent to the switch. The certificate is further forwarded to an access control server, wherein the access control server requests a certification authority via an active directory if the certificate is valid for the account, and wherein the access control server, the certification authority, and the active directory are comprised in the domain server.

In accordance with an embodiment of the invention, the certificate is sent from the domain server to the switch by use of an extensible authentication protocol-transport layer security (EAP-TLS) algorithm, and wherein the certificate is forwarded from the switch to the access control server by use of a radius packet in accordance with the radius protocol. The radius (Remote Authentication Dial-In User Service) protocol is described in the documents RFC 2865 and RFC 2866 herein incorporated by reference. The method in accordance with the invention is particularly advantageous as standard components and standard software components can be employed for implementing the method in accordance with the invention.

In accordance with an embodiment of the invention, a remote monitoring (RMON) agent sends a first trap to a simple network management protocol (SNMP) manager after the layer two access port has become active, wherein the SNMP manager requests the first value in response to the first trap, wherein the RMON agent sends a second trap to the SNMP manager after the layer two access port has become inactive, and wherein the SNMP manager requests the second value in response to the second trap.

In accordance with an embodiment of the invention, the user is assigned to a group of users, and wherein the user specific network usage is summed up with the network usages of all users of the group of users. The group of users can for example comprise all users that belong to a department or a division of a company or organization. By summing up the usage specific network usages of all sessions of all users of the department, the department can be charged monthly for the network usages of all its users.

In another aspect the invention relates to a computer program product comprising computer executable instructions for performing a method in accordance with the invention.

In accordance with another embodiment of the invention a data processing system is provided for determining user specific network usage of a network when a user accesses the network from a client system comprising means for assigning a layer two access port of a switch to the user of the client system for a session, and means for determining a first value being indicative of the magnitude of a packet counter of the layer two access port, when the layer two access port becomes active. The data processing system further comprises means for determining a second value being indicative of the magnitude of another packet counter when the layer two access port becomes inactive and means for storing the first value and the second value.

BRIEF DESCRIPTION OF THE DRAWINGS

In the following, preferred embodiments of the invention will be described in greater detail by way of example only making reference to the drawings in which.

DETAILED DESCRIPTION OF THE INVENTION

The present invention can be realized in hardware, software, or a combination of hardware and software. Any kind of computer system—or other apparatus adapted for carrying out the methods described herein is suitable. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when being loaded in a computer system is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Figure 1:
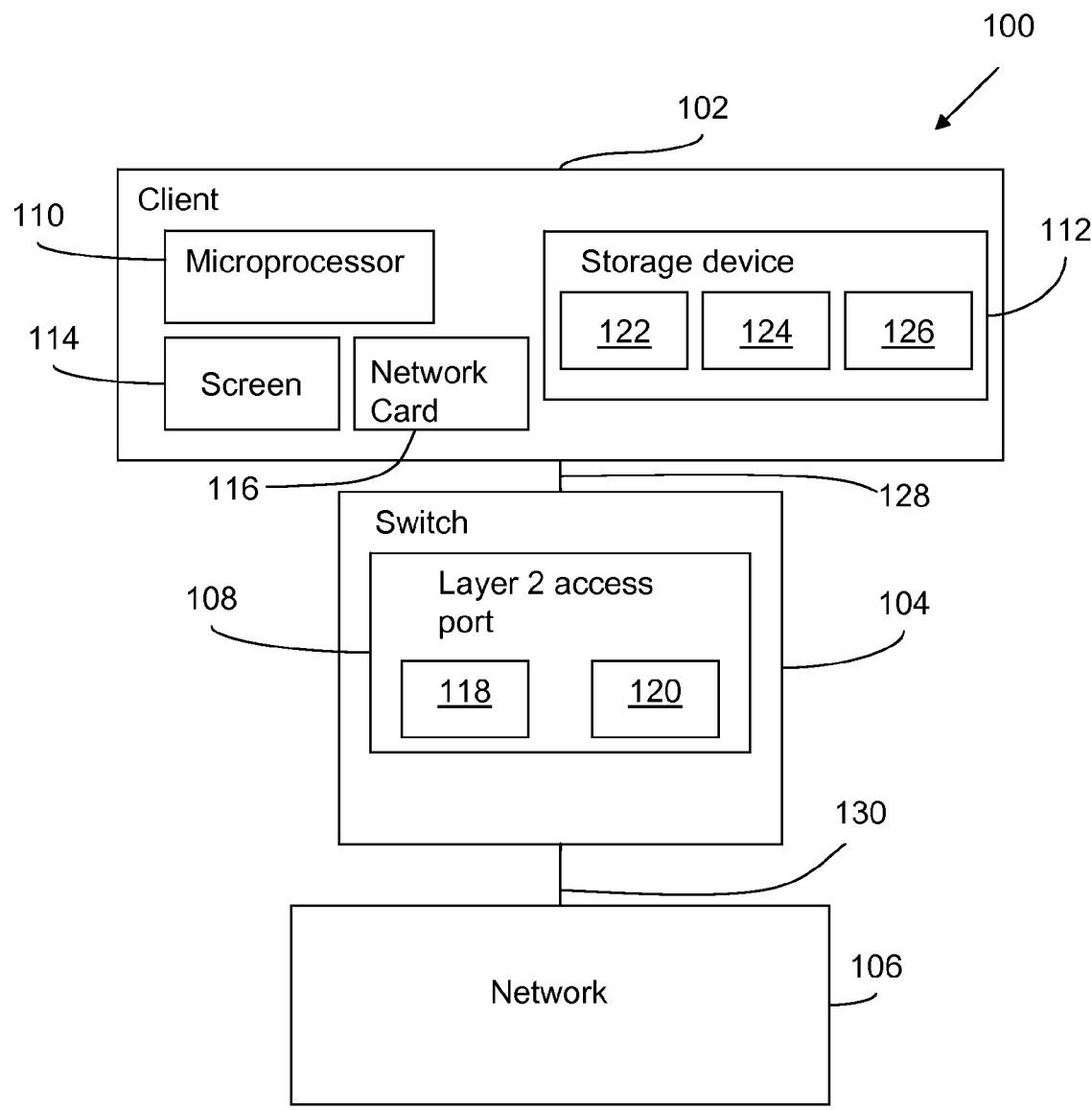
FIG. 1 shows a block diagram of a client system and a network, whereby the client system is connectable to the network via a switch.

FIG. 1 shows a block diagram 100 of a client system 102 which is connectable via a switch 104 to a network 106. Client system 102 is also referred to hereinbelow as client. Client system 102 can be a typical personal computer which comprises a microprocessor 110, a screen 114, a network card 116, and a storage device 112. When a user logs onto client system 102, the user starts, for example, a web browser which is a computer program product that is executed by microprocessor 110 and visualized on screen 114. The web browser provides means for browsing the content of the world wide web or more particularly of an intranet of a network, if a connection to that network or to the world wide web is established.

The connection to network 106 is physically established by use of network card 116. Network card 116 is connected via a connection 128 to switch 104, which is further connected to network 106 via a connection 130. Connections 128 and 130 can be wired or wireless connections. Switch 104 comprises one or more layer two access ports such as layer two access port 108.

When the user demands access to network 106, then layer two access port 108 is assigned uniquely to the user of client system 102 for a user's session. A first value 122 which is indicative of the magnitude of a packet counter 118 of layer two access port 108 is determined at the point in time when the layer two access port is assigned to the user. A second value 124 which corresponds to the magnitude of another packet counter 120 of layer two access port 108 is determined at the point in time when layer two access port becomes inactive. Layer two access port 108 becomes inactive when the user for example ends the session. First value 122 and second value 124 are stored on storage device 112.

A user specific network usage is determined by taking the difference between second value 124 and first value 122. A user specific network usage 126 corresponds to the difference of the magnitude of the packet counters at the end and at the beginning of the user's session.

Figure 2:
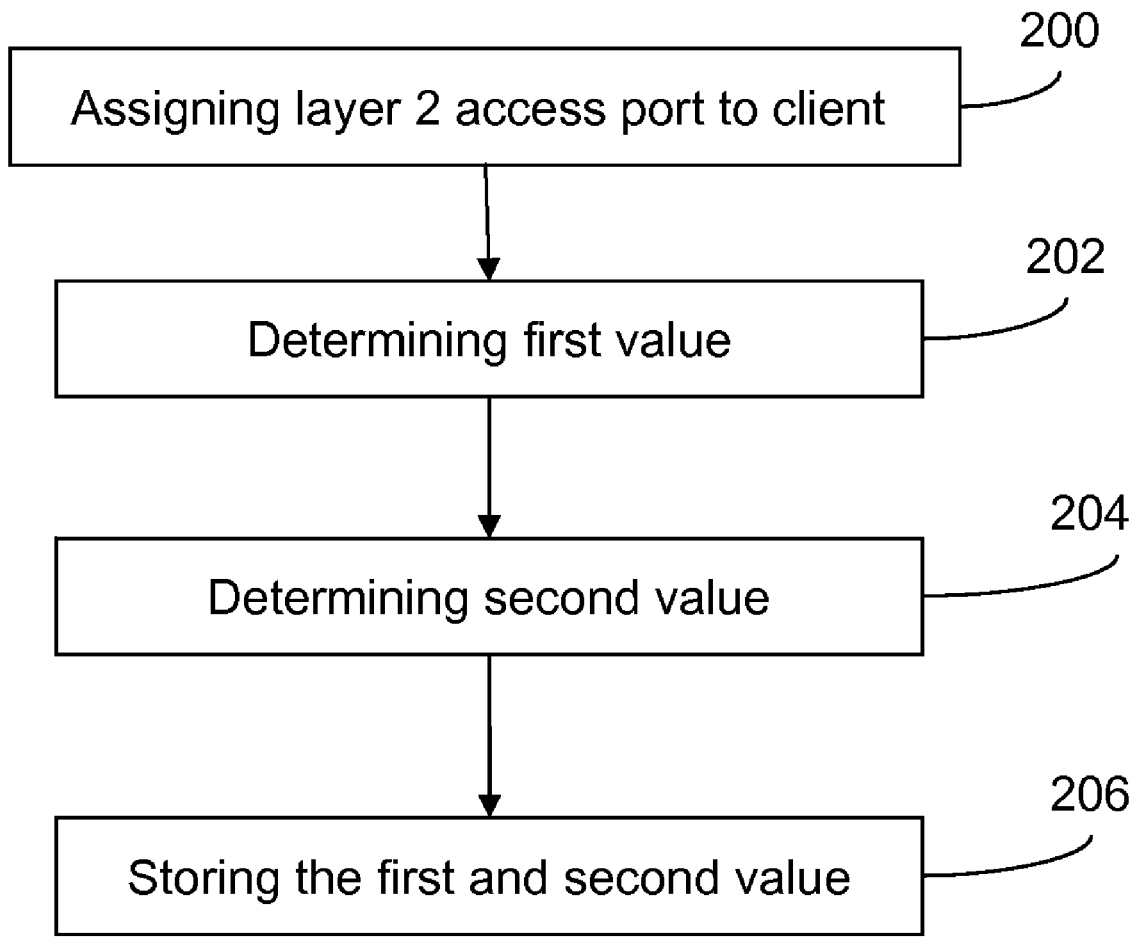
FIG. 2 shows a flow diagram illustrating the basic steps performed by the method in accordance with the invention.

FIG. 2 shows a flow diagram illustrating the basic steps performed by the method in accordance with the invention. In step 200 the layer two access port of the switch is assigned to the user of the client system for a session. In step 202 the first value which is indicative of the magnitude of the packet counter of the layer two access port is determined when the layer two access port becomes active. In step 204 a second value which is indicative of the magnitude of the packet counter is determined when the layer two access port becomes inactive. In step 206 the first and the second value are stored.

Figure 3:
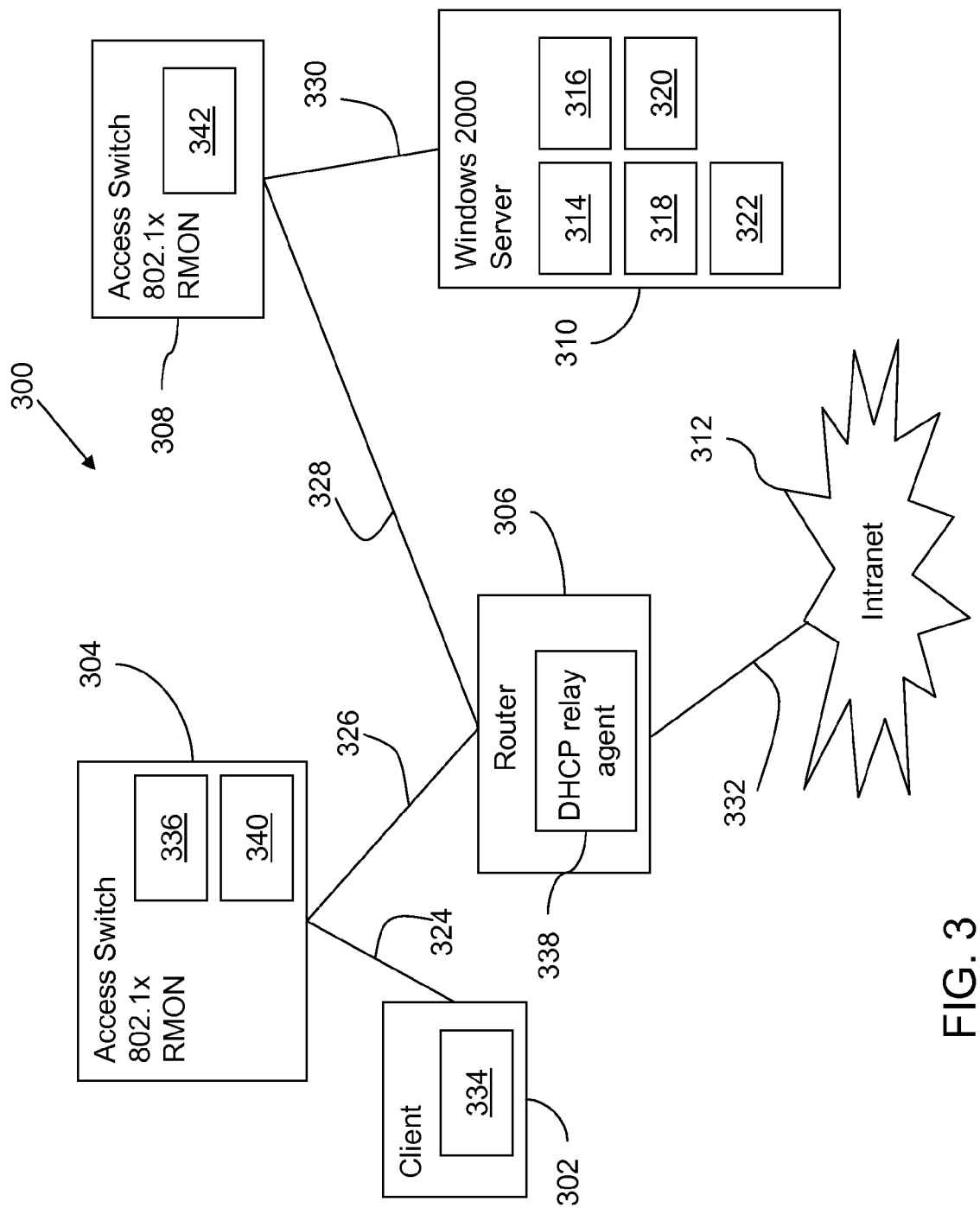
FIG. 3 shows a block diagram of a network configuration by which the network usage of each user can be determined.

FIG. 3 shows a block diagram of a network configuration 300 by which the usage of a network by a user can be determined. In this example, the network is an intranet 312 of a company or an organization. Network configuration 300 consists of a client system 302, an access switch 304, a router 306, another access switch 308 and a Windows 2000 server 310. Client system 302 is connected to access switch 304 via a connection 324. Access switch 304 connects to router 306 through a connection 326. Router 306 provides access to intranet 312 via a connection 332. Router 306 is further connected via a connection 328 to access switch 308, which is connected via a connection 330 to Windows 2000 server 310. Windows 2000 server 310 is an example of a domain server. Other implementations in accordance with the invention may employ a Linux server or other server as domain server.

Windows 2000 server 310 comprises the following software components: an active directory 314, a DHCP server 316, a Certificate Authority (CA) 318, a secure access control server (ACS) 320, and a SNMP manager 322. In another implementation in accordance with the invention, CA 318 could be replaced by a Lightweight Directory Access Protocol-server (LDAP-server).

Access switches 304 and 308 as well as router 306 are commercial hardware. They are for example available from Cisco Systems Incorporation. Access switches 304 and 308 further support 802.1 X certificates and remote monitoring (RMON). For remote monitoring, each of the switches 304 and 308 comprise a RMON agent 340, 342.

In order to access intranet 312, a user working on client system 302 has to be authenticated with a certificate 334 at a layer two access port 336 of access switch 304. Certificate 334 has been previously drawn up to the account of the user at active directory 314 of Windows 2000 server 310 by Certificate Authority 318.

Certificate 334 is sent by use of an extensible authentication protocol (EAP)-transport layer security (TLS) method to layer two access port 336 of access switch 304. Certificate 334 is further forwarded by use of the radius (Remote Authentication Dial-In User Service) protocol (RFC 2865, RFC 2866) to access control system server 320.

Secure access control server 320 requests Certificate Authority 318 via active directory 314 if certificate 334 of the user is valid. If this is the case, access control server 320 sends a radius packet to the access switch 304, whereby layer two access port 336 is assigned to the user of the client. RMON agent 340 realizes that layer two access port 336 has been activated and sends a trap to SNMP manager 322. An example of RMON agent 340 configuration on the used Cisco hardware is:

RMON event 1 lock trap private description "port 1 changed Vlan into an user Vlan" owner config
RMON event 2 lock trap private description "port 1 changed Vlan back to Vlan 1" owner config
RMON alarm 1 vmVlan.1 1 absolute rising-threshold 2 1 falling-threshold 1 2 owner config In response, SNMP manager 322 requests the magnitude of the packet counter of layer two access port 336. The magnitude of the packet counter is stored as a first value, for example, on server 310.

After layer two access port 336 is assigned to client 302, router 306 assigns by use of a DHCP relay agent 338 an IP address to client 334. The user on client 302 is now able to access intranet 312 via access switch 304 and router 306.

If layer two access port 336 becomes inactive, then RMON agent 340 sends a trap to the SNMP manager which requests in response the magnitude of the packet counter of layer two access port 336. The magnitude of the packet counter is stored as a second value, for example, on server 310.

The network usage of the user during the session is determined from the difference between the second value and the first value. By summing the network usages determined for a user over the period of a month, the user can be charged monthly in accordance with the network usage.

Figure 4A:
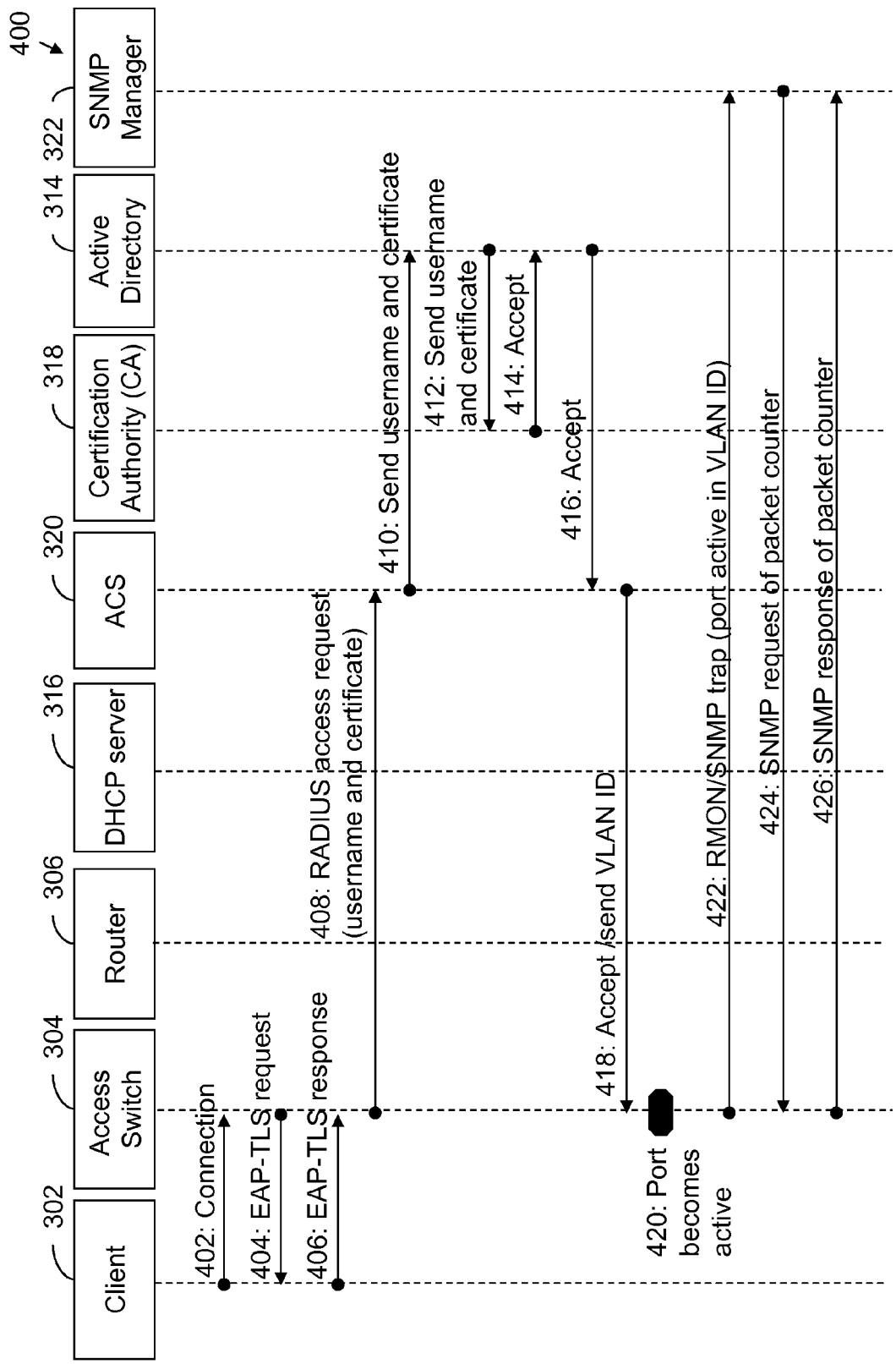
FIG. 4A, 4B show a sequence of operation diagram illustrating the basic steps performed by the method in accordance with the invention when implemented in the network configuration as shown schematically in FIG. 3.
Figure 4B:
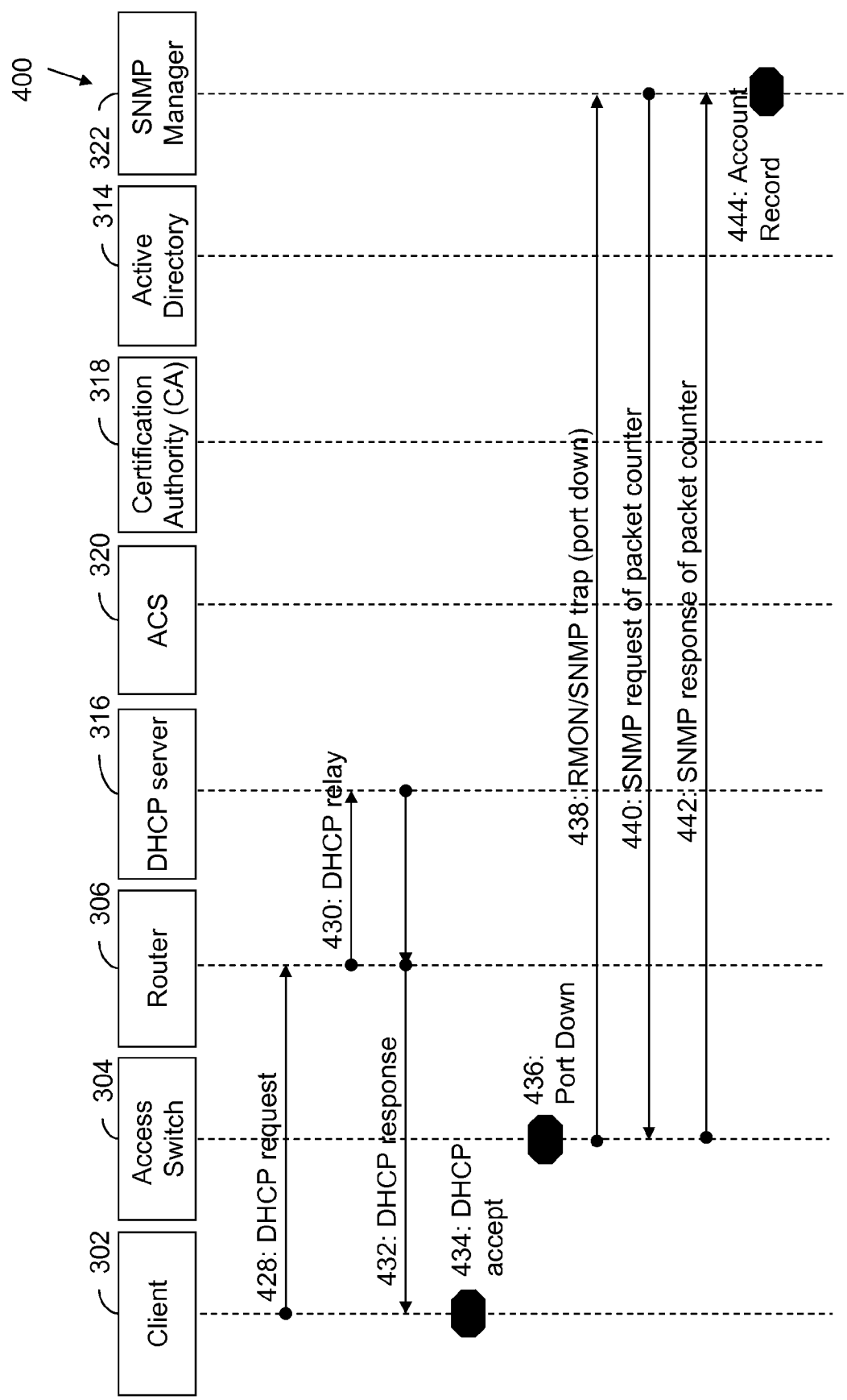

FIG. 4A and FIG. 4B show a sequence of operation diagram 400 illustrating the basic steps performed by the method in accordance with the invention when implemented in the network configuration described in FIG. 3. In step 402 client 302 connects to access switch 304, which sends an EAP-TLS request in step 404 back to client 302. In response to the EAP-TLS request in step 406 client 302 sends an EAP-TLS response to access switch 304.

Access switch 304 forwards the access request by use of the RADIUS protocol to the ACS in step 408. The access request comprises the user name of the user and the certificate by which the user is uniquely identifiable. ACS 320 sends the username and the certificate to active directory 314 in step 410. ACS 320 forwards the username and the certificate to CA 318 in step 412. CA 318 checks if the username and the certificate are valid and if this is the case, then sends a corresponding message to active directory 314 in step 414. Active directory 314 further forwards this message to ACS 320 in step 416. In step 418, ACS 320 sends a VLAN ID to access switch 304 by which the layer two access port of the switch is activated in step 420.

The access switch sends a RMON/SNMP trap signal to SNMP manager 322 in step 422 which responds in step 424 by requesting the magnitude of the packet counter of layer two port 336. In step 426 a SNMP response comparing the magnitude of the packet counter of the port is sent to SNMP manager 322. In step 428 a request is sent by client 302 to router 306 by which an IP address is requested. Router 306 requests, by use of the DHCP relay agent, an IP number from DHCP server 316 in step 430. In step 432, the IP address is assigned by DHCP server 316 via router 306 to client 302 which accepts the IP address in step 434. The user of the client now has access to intranet 312. If the layer two port goes down in step 436, for example, when the user logs off, then a RMON/SNMP trap is sent to SNMP manager 322 in step 438. In step 440 SNMP manager 322 requests the magnitude of the packet counter which is received in step 442 from access switch 304. In step 444, the network usage is determined and recorded by the difference between the magnitude of the packet counter as determined by SNMP manager 322 in step 442 and the magnitude of the packet counters as determined by the SNMP manager in step 426.

LIST OF REFERENCE NUMERALS

100 Block diagram
102 Client
104 Switch
106 Network
108 Layer two access port
110 Microprocessor
112 Storage device
114 Screen
116 Network card
118 Packet counter
120 Packet counter
122 First value
124 Second value
126 User specific network usage
128 Connection
130 Connection
300 Network configuration
302 Client
304 Access switch
306 Router
308 Access switch
310 Server
312 Intranet
314 Active directory
316 DHCP server
318 Certificate Authority
320 Access control server
322 SNMP manager
324 Connection
326 Connection
328 Connection
330 Connection
332 Connection
334 Certificate
336 Layer two access port
338 DHCP relay agent
340 RMON agent
342 RMON agent

The invention claimed is:
1. A method of determining usage of a network by a specific user when the user accesses the network from a terminal of a client system, the method comprising the steps of:
said specific user accessing the network from a terminal of the client system;
validating an identity of the specific user;

when the identity of the specified user is validated, assigning to the specific user a layer two access port of a switch of the client system for a session with the network;

determining a first value being indicative of the magnitude of a packet counter of the layer two access port when the layer two access port is assigned to the specific user;

transmitting data over the network to the specific user;

determining a second value being indicative of the magnitude of another packet counter when the layer two access port becomes inactive;

storing the first value and the second value; and determining from the first and second values, the usage of the network by said specific user during said session; and wherein:

the transmitting data includes after said first value is obtained, sending a network address to the specific user, and transmitting the data over the network to said network address.

2. The method of claim 1, wherein the step of determining the usage of the network by the specific user includes determining said usage by taking the difference between the second value and the first value.

3. The method of claim 2, further comprising the step of receiving a user specific certificate at the switch, wherein the layer two access port of the switch is assigned to the user for the session after validation of the certificate.

4. A method of, determining user specific network usage of a network when a user accesses the network from a client system, the method comprising the steps of:

assigning a layer two access port of a switch to the user of the client system for a session;

determining a first value being indicative of the magnitude of a packet counter of the layer two access port when the layer two access port becomes active;

determining a second value being indicative of the magnitude of another packet counter when the layer two access port becomes inactive;

storing the first value and the second value;

determining the user specific network usage of the session by taking the difference between the second value and the first value;

receiving a user specific certificate at the switch, wherein the layer two access port of the switch is assigned to the user for the session after validation of the certificate;

assigning the certificate to an account of the user, the certificate being requested from a certification authority;

sending the certificate to the switch; and forwarding the certificate to an access control server, the access control server requesting the certification authority via an active directory if the certificate is valid for the account, wherein the access control server, the certification authority, and the active directory are included in a domain server connected to the client system.

5. The method of claim 4, further comprising the steps of sending the certificate from the domain server to the switch by use of an extensible authentication protocol-transport layer security (EAP-TLS) algorithm, and forwarding the certificate from the switch to the access control server by use of a radius packet in accordance with a radius protocol.

6. The method of claim 5, further comprising the steps of sending a first trap from a remote monitoring agent to a simple network management protocol manager after the layer two access port has become active, the simple network management protocol requesting, in response to the first trap, the first value, the remote monitoring agent send a second trap to the simple network management protocol manager after the layer two access port has become inactive, and the simple network management protocol manager requesting in response to the second trap the second value.

7. The method of claim 6, further comprising the steps of assigning the user to a group of users, and summing the user specific network usage of all users of the group.

8. A computer program product comprising a computer readable storage device tangibly embodying a program of instructions for determining usage of a network by a specific user when the user accesses the network from a terminal of a client system, wherein, when the program of instructions is executed on a computer system, the program of instructions performs the following:

receiving a request from the specific user to access the network from a terminal of the client system;

validating an identity of the specific user;

when the identity of the specific user is validated, assigning to the specific user a layer two access port of a switch of the client system for a session with the network;

determining a first value being indicative of the magnitude of a packet counter of the layer two access port when the layer two access port is assigned to the specific user;

transmitting data over the network to the specific user;

determining a second value being indicative of the magnitude of another packet counter when the layer two access port becomes inactive;

storing the first value and the second value; and determining from the first and second values, the usage of the network by said specific user during said session; and wherein:

the transmitting data includes after said first value is obtained, sending a network address to the specific user, and transmitting the data over the network address.

9. The computer program product of claim 8, wherein when the computer program is executed on the computer system, the program of instructions performs the further step of determining the user specific network usage of the session by taking the difference between the second value and the first value.

10. The computer program product claim 9, wherein when the computer program is executed on the computer system, the program of instructions performs the further step of receiving a user specific certificate at the switch, wherein the layer two access port of the switch is assigned to the user for the session after validation of the certificate.

11. The computer program product claim 10 when the computer program is executed on the computer system, the program of instructions performs the further steps of:

assigning the certificate to an account of the user, the certificate being requested from a certification authority;

sending the certificate to switch; and forwarding the certificate to an access control server, the access control server requesting the certification authority via an active directory if the certificate is valid for the account, wherein the access control server, the certification authority, and the active directory are included in a domain server connected to the client system.

12. The computer program product of claim 11, wherein when the computer program is executed on the computer system, the program of instructions performs the further steps of sending the certificate from the domain server to the switch by use of an extensible authentication protocol-transport layer security (EAP-TLS) algorithm, and forwarding the certificate from the switch to the access control server by use of a radius packet in accordance with a radius protocol.

13. The computer program product of claim 12, wherein when the computer program is executed on the computer system, the program of instructions performs the further steps of sending a first trap from a remote monitoring agent to a simple network management protocol manager after the layer two access port has become active, the simple network management protocol requesting in response to the first trap the first value, the remote monitoring agent sending a second trap to the simple network management protocol manager after the layer two access port has become inactive, and the simple network management protocol manager requesting in response to the second trap the second value.

14. A data processing system for determining usage of a network by a specific user when the user accesses the network from a terminal of a client system, the data processing system comprising:
- means for receiving from said specific user a request to access the network from a terminal of the client system;
- means for validating an identity of the specific user;
- means for assigning to the specific user a layer two access port of a switch of the client system for a session with the network;
- means for determining a first value being indicative of the magnitude of a packet counter of the layer two access port when the layer two access port is assigned to the specific user;
- means for transmitting data over the network to the specific user;
- means for determining a second value being indicative of the magnitude of another packet counter when the layer two access port becomes inactive;
- means for storing the first value and the second value; and
- means for determining from the first and second values, the usage of the network by said user during said session; and wherein:

the transmitting data to the specific user includes, after said first value is obtained, sending a network address to the specific user, and transmitting the data over the network to said network address.

15. The data processing system of claim 14, wherein the means for determining the user specific network usage of the session determines said usage by taking the difference between the second value and the first value.

16. The data processing system of claim 15, further comprising means for receiving a user specific certificate at the switch, wherein the layer two access port of the switch is assigned to the user for the session after validation of the certificate.

17. The data processing system of claim 16, further comprising:
- means for assigning the certificate to an account of the user, the certificate being requested from a certification authority;
- means for sending the certificate to the switch; and
- means for forwarding the certificate to an access control server, the access control server requesting the certification authority via an active directory if the certificate is valid for the account, wherein the access control server, the certification authority, and the active directory are included in a domain server connected to the client system.

18. The data processing system of claim 17, further comprising means for sending the certificate from the domain server to the switch by use of an EAP-TLS algorithm, and means for forwarding the certificate from the switch to the access control server by use of a radius packet in accordance with a radius protocol.

19. The data processing system of claim 18, further comprising means for sending a first trap from a remote monitoring agent to a simple network management protocol manager after the layer two access port has become active, the simple network management protocol requesting in response to the first trap the first value, the remote monitoring agent send a second trap to the simple network management protocol manager after the layer two access port has become inactive, and the simple network management protocol manager requesting in response to the second trap the second value.

20. The data processing system of claim 19, further comprising means for assigning a user to a group of users, and summing up the user specific network usage of all users of the group of users.

* * * * *